(12) United States Patent
Chien

(10) Patent No.: US 7,533,450 B2
(45) Date of Patent: May 19, 2009

(54) HINGE

(75) Inventor: Hsiang-Chi Chien, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 244 days.

(21) Appl. No.: 11/584,456

(22) Filed: Oct. 20, 2006

(65) Prior Publication Data
US 2008/0168624 A1 Jul. 17, 2008

(51) Int. Cl.
E05D 3/10 (2006.01)

(52) U.S. Cl. ............... 16/367; 16/282; 16/287; 16/294; 16/302; 16/366

(58) Field of Classification Search .......... 16/282, 16/287, 288, 294, 302, 366–370; 361/680–683; 455/575.3; 379/433.13; 312/223.1–223.6; 345/169, 905; 349/58, 65
See application file for complete search history.

(56) References Cited
U.S. PATENT DOCUMENTS 7,017,235 B2 * 3/2006 Lu et al. ............... 16/367
7,055,218 B2 * 6/2006 Lu et al. ............... 16/367
7,319,749 B2 * 1/2008 Lu et al. ............... 379/433.13
2005/0005399 A1 * 1/2005 Lu et al. ............... 16/367
2005/0076474 A1 * 4/2005 Lu et al. ............... 16/280
2005/0150080 A1 * 7/2005 Lu et al. ............... 16/367
2005/0283949 A1 * 12/2005 Lu et al. ............... 16/367
2007/0136992 A1 * 6/2007 Lu et al. ............... 16/330
2007/0174997 A1 * 8/2007 Lu et al. ............... 16/367
2008/0034547 A1 * 2/2008 Hsu ............... 16/367

* cited by examiner

Primary Examiner—Victor Batson
Assistant Examiner—Emily M Morgan
(74) Attorney, Agent, or Firm—William E. Pelton, Esq.; Cooper & Dunham LLP

(57) ABSTRACT

A hinge has a base, a first bracket, a second bracket and a vertical-angular-positioning assembly. The first bracket is mounted pivotally on the base. The second bracket is mounted pivotally on the base. The vertical-angular-positioning assembly is mounted on the base, positions the second bracket in specific angular positions relative to the base and has positioning rings and a sleeve. The sleeve is mounted on the base and prevents dust from accumulating in the sleeve. With the arrangement of the sleeve, the hinge is durable.

3 Claims, 8 Drawing Sheets

HINGE

BACKGROUND OF THE INVENTION

1. Field of the Invention

The present invention relates to a hinge, and more particularly to a hinge that has a first bracket, a second bracket and a vertical-angular-positioning assembly having a sleeve to prevent dust from accumulating in the vertical-angular-positioning assembly.

2. Description of Related Art

Foldable electrical devices such as foldable cellular phones are used widely due to their compactness.

A conventional foldable cellular phone has a body, a cover and a hinge. The hinge connects the cover pivotally to the body so the cover may cover the body when the cellular phone is folded. The hinge has a positioning assembly that may position the cover at a specific angular position relative to the body.

However, the positioning assembly are exposed on the hinge and dust may be accumulated on and fail the positioning assembly.

To overcome the shortcomings, the present invention provides a hinge to mitigate or obviate the aforementioned problems.

SUMMARY OF THE INVENTION

The main objective of the invention is to provide a hinge that has a first bracket, a second bracket and a vertical-angular-positioning assembly having a sleeve to prevent dust from accumulating in the a vertical-angular-positioning assembly.

The hinge in accordance with the present invention comprises a base, a first bracket, a second bracket and a vertical-angular-positioning assembly. The first bracket is mounted pivotally on the base. The second bracket is mounted pivotally on the base. The vertical-angular-positioning assembly is mounted on the base, positions the second bracket in specific angular positions relative to the base and has positioning rings and a sleeve. The sleeve is mounted on the base and prevents dust from accumulating in the sleeve.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
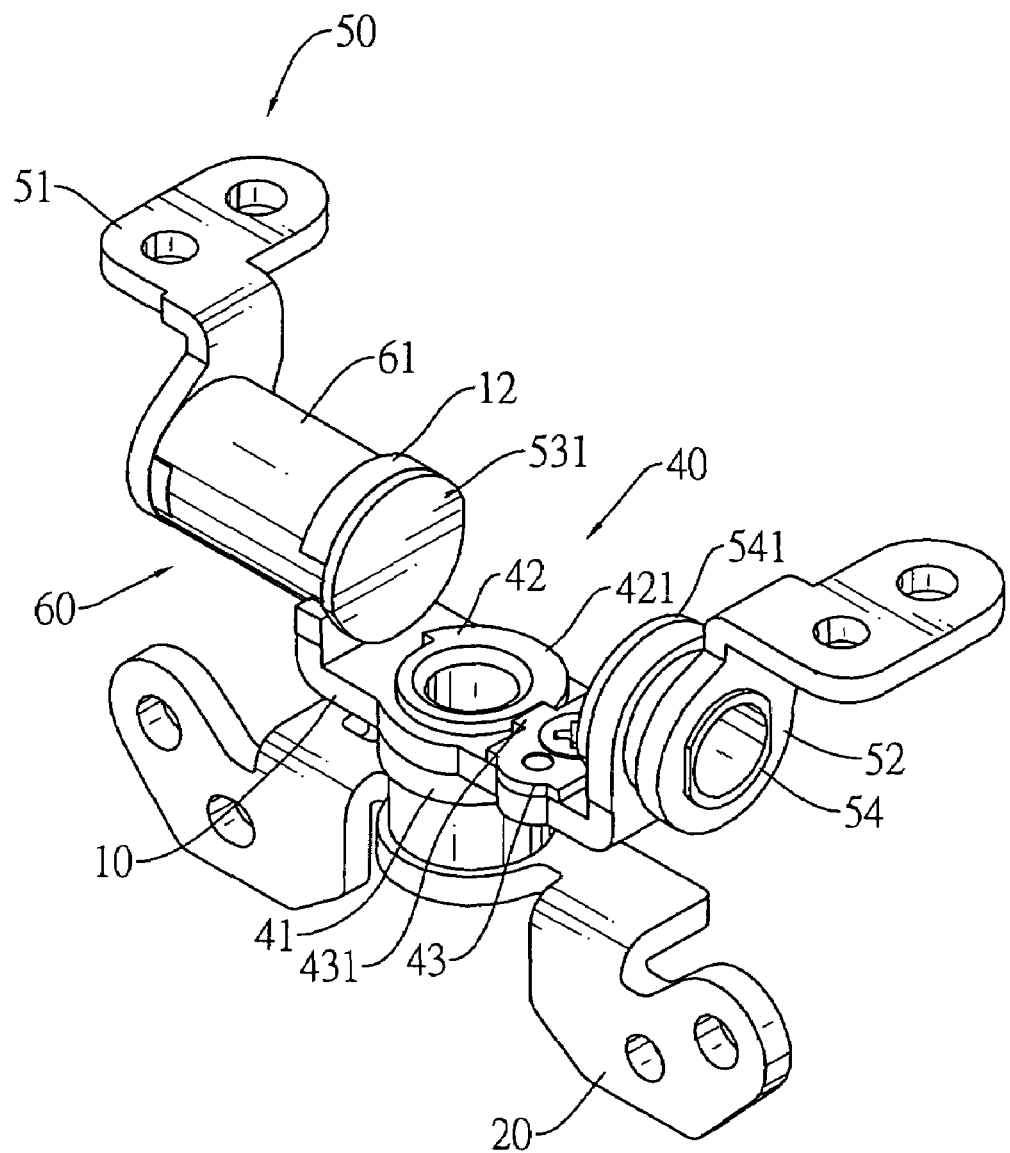
FIG. 1 is a perspective view of a hinge in accordance with the present invention.
Figure 2:
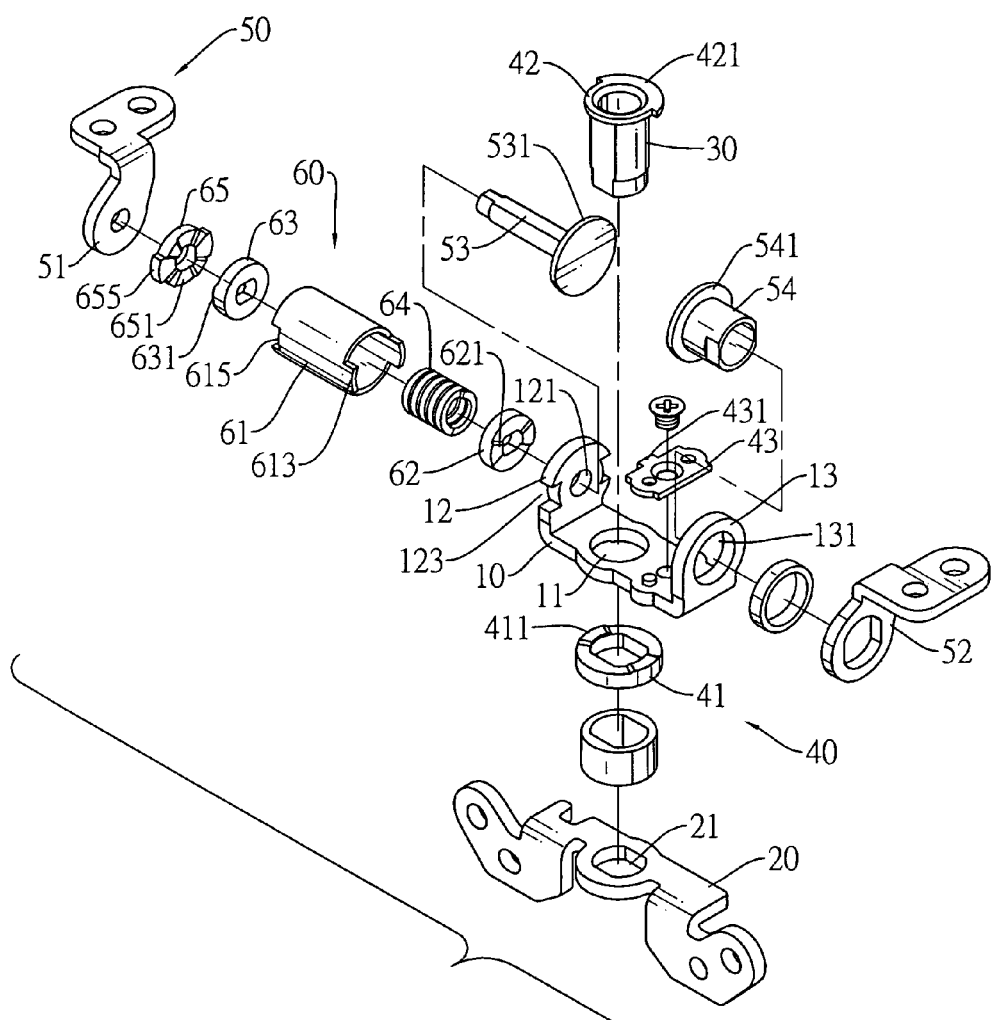
FIG. 2 is an exploded perspective view of the hinge in FIG. 1.

With reference to FIGS. 1 and 2, a hinge in accordance with the present invention is used with an electrical device such as a foldable cellular phone having a body and a cover. The cover is mounted pivotally on the cover through the hinge.

The hinge comprises a base (10), a first bracket (20), a vertical shaft (30), a horizontal-angular-positioning assembly (40), a second bracket (50) and a vertical-angular-positioning assembly (60).

Figure 3:
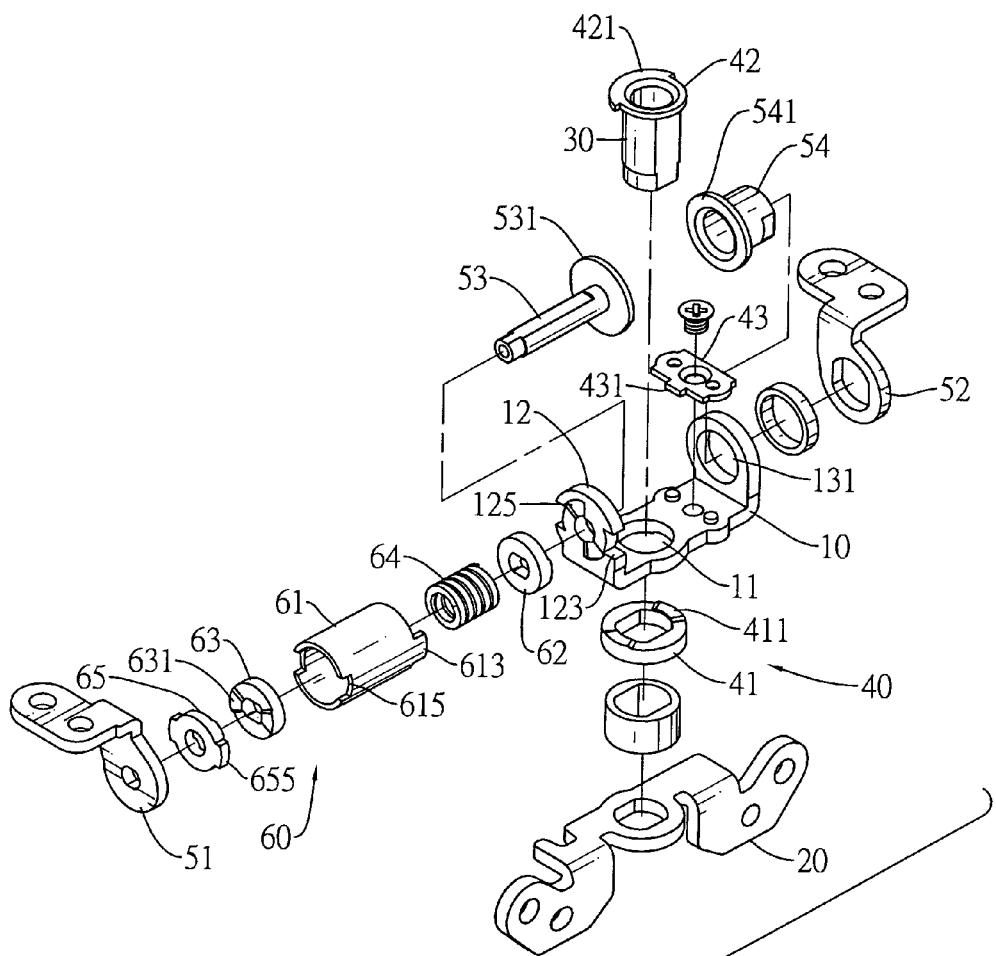
FIG. 3 is another exploded perspective view of the hinge in FIG. 1.
Figure 4:
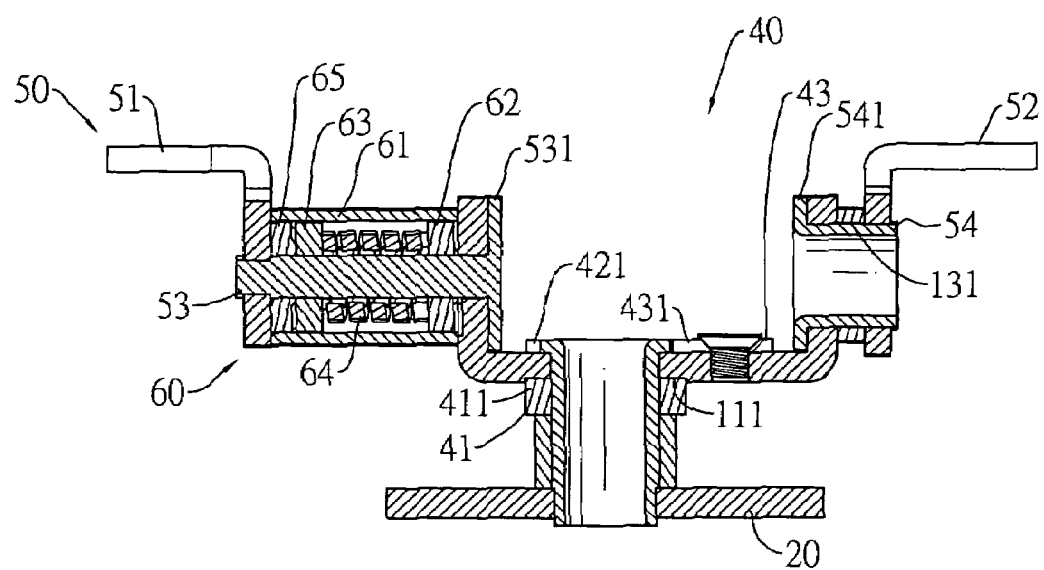
FIG. 4 is a front view in partial section of the hinge in FIG. 1.

With reference to FIGS. 3 and 4, the base (10) has a top, a bottom, two opposite sides, a shaft hole (11), two horizontal-angular-positioning recesses (111), a vertical-angular-positioning tab (12) and a mounting tab (13).

The shaft hole (11) is defined vertically through the base (10).

The horizontal-angular-positioning recesses (111) are defined in the bottom of the base (10) and are arranged around the shaft hole (11).

The vertical-angular-positioning tab (12) is formed on and protrudes perpendicularly from one side of the base (10) and has an outside, an outer edge, a shaft hole (121), multiple mounting notches (123) and two inside positioning recesses (125). The shaft hole (121) is defined horizontally through the vertical-angular-positioning tab (12). The mounting notches (123) are defined in the outer edge of the vertical-angular-positioning tab (12). The inside positioning recesses (125) are defined in the outside of the vertical-angular-positioning tab (12).

The mounting tab (13) is formed on and protrudes perpendicularly from the other side of the base (10) and has a shaft hole (131) defined horizontally through the mounting tab (13).

The first bracket (20) connects to the body (10), is mounted pivotally on the bottom of the base (10) and has a shaft hole (21) defined vertically through the first bracket (20) and having a non-circular cross section.

The vertical shaft (30) is mounted vertically and rotatably through the shaft hole (11) in the base (10) and is mounted non-rotatably through the shaft hole (21) in the first bracket (20) to allow the first bracket (20) to rotate horizontally on the base (10). The vertical shaft (30) has a top end and a non-circular cross section corresponding to that of shaft hole (21) in the first bracket (20).

The horizontal-angular-positioning assembly (40) is mounted on the base (10) and the vertical shaft (30) and has a horizontal-angular-positioning ring (41), a stationary limit (43) and a limiting ring (42).

The horizontal-angular-positioning ring (41) is mounted non-rotatably and slidably around the vertical shaft (30) adjacent to the bottom of the base (10) and has a shaft hole and two positioning protrusions (411). The shaft hole is defined through the horizontal-angular-positioning ring (41), allows the vertical shaft (30) to extend through the shaft hole and has a non-circular cross section corresponding to that of the vertical shaft (30). The positioning protrusions (411) are formed on and protrude from the positioning ring (41), are arranged around the shaft hole in the positioning ring (41) and selectively engage respectively with the horizontal-angular-positioning recesses (111) in the bottom of the base (10).

The stationary limit (43) is mounted on the top of the base (10) and has a limiting protrusion (431) formed on and protruding from the stationary limit (43) toward the vertical shaft (30).

Figure 5:
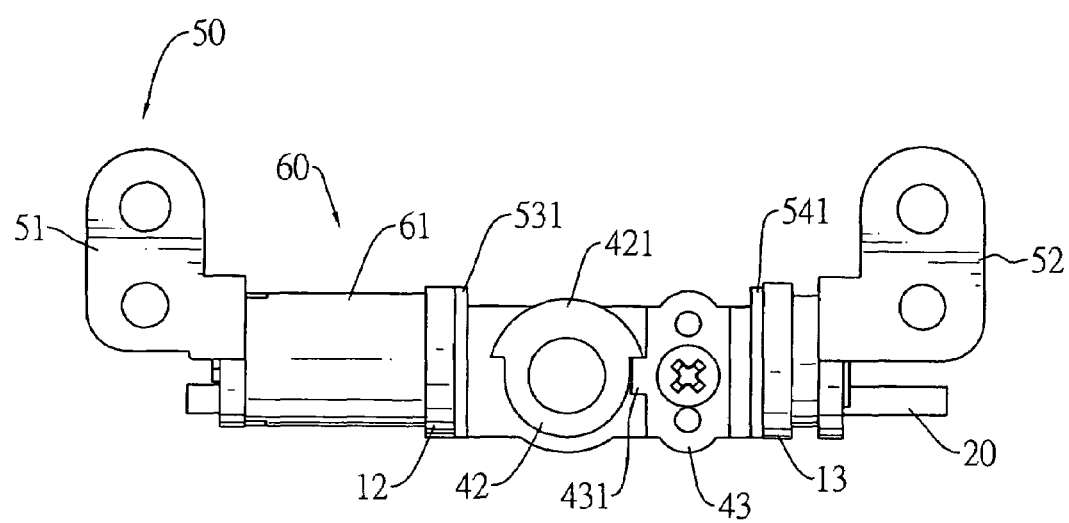
FIG. 5 is a top view of the hinge in FIG. 1.
Figure 6:
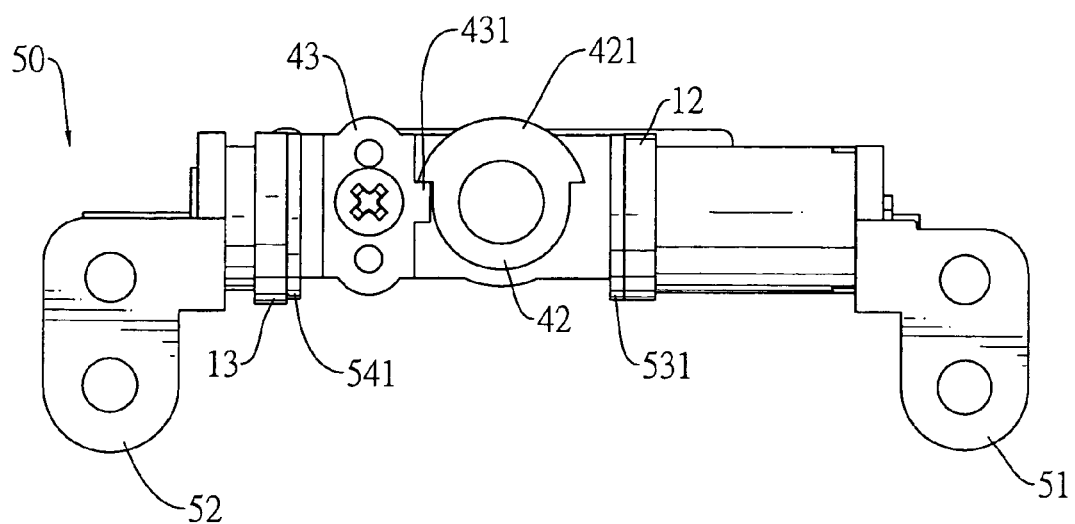
FIG. 6 is an operational top view of the hinge in FIG. 1 with the base, the horizontal-angular-positioning assembly, the second bracket and the vertical-angular-positioning assembly rotating 180° relative to the first bracket and the vertical shaft.

With reference to FIGS. 5 and 6, the limiting ring (42) is mounted on the top end of the vertical shaft (30) and has an outer edge and a limiting protrusion (421). The limiting protrusion (421) is semi-circular, is formed on and radially protruding from the outer edge of the limiting ring (42) and has two ends selectively abutting the limiting protrusion (431) on the stationary limit (43).

The second bracket (50) connects to the cover, is mounted pivotally on the base (10) and has a first connector (51), a first horizontal shaft (53), a second connector (52) and a second horizontal shaft (54).

The first connector (51) connects to the cover and is mounted pivotally on the vertical-angular-positioning tab (12).

The first horizontal shaft (53) is mounted rotatably through the shaft hole (121) in the vertical-angular-positioning tab (12) on the base (10) and is mounted securely on the first connector (51) to allow the first connector (51) to pivotally mount on the base (10). The first horizontal shaft (53) has an inside end, a non-circular cross section and a flange (531). The flange (531) is formed on and protrudes radially from the inside end and abuts the vertical-angular-positioning tab (12) to prevent the first horizontal shaft (53) from falling out of the vertical-angular-positioning tab (12).

The second connector (52) connects to the cover and is mounted pivotally on the mounting tab (13) on the base (10).

The second horizontal shaft (54) is mounted rotatably through the shaft hole (131) in the mounting tab (13) on the base (10) to allow the second connector (52) to pivotally mount on the mounting tab (13). The second horizontal shaft (54) has an inside end, a non-circular cross section and a flange (541). The flange (541) is formed on and protrudes radially from the inside end of the second horizontal shaft (54) to prevent the second horizontal shaft (54) from falling out of the mounting tab (13).

Figure 7:
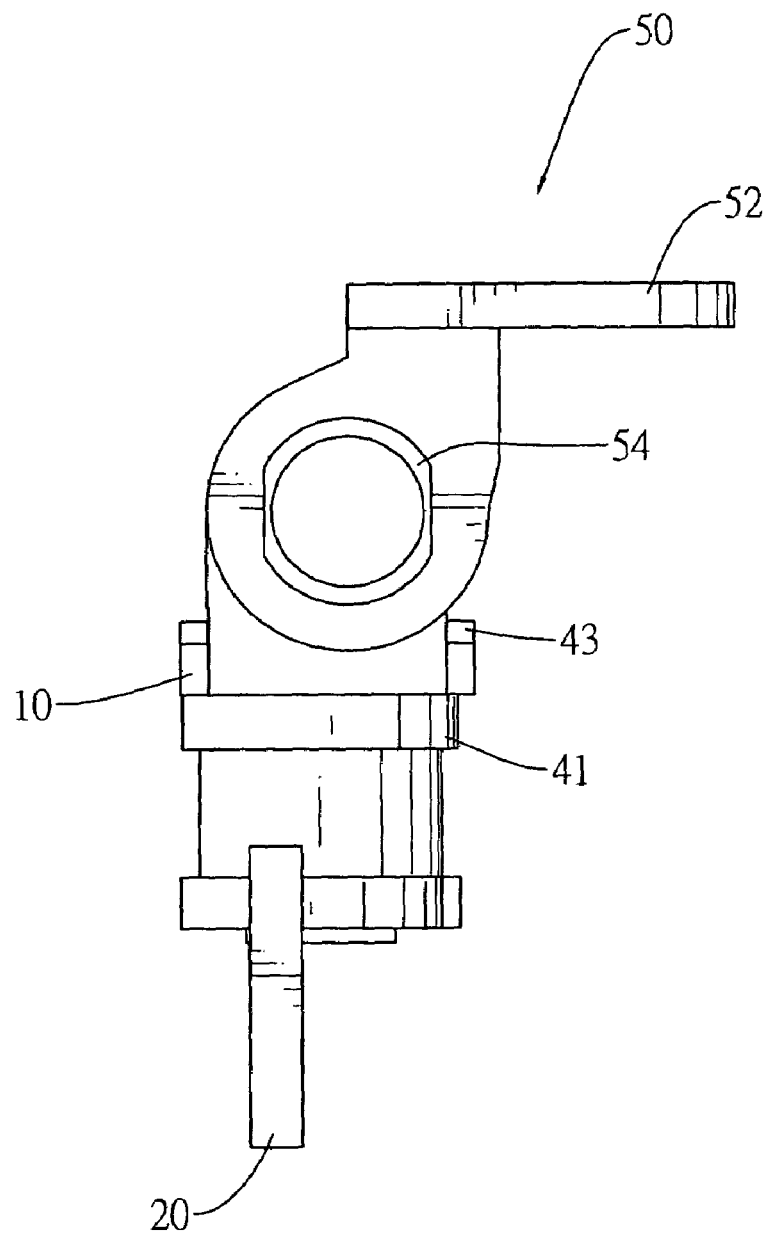
FIG. 7 is a side view of the hinge in FIG. 1.
Figure 8:
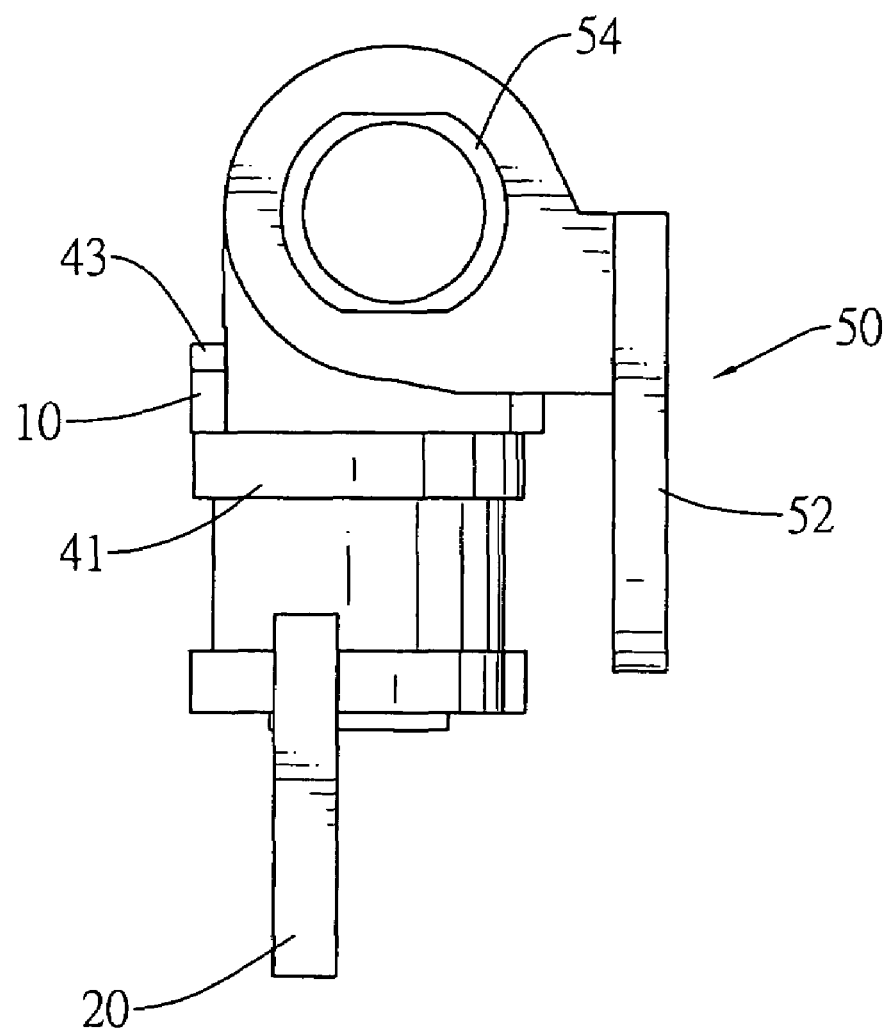
FIG. 8 is an operational side view of the hinge in FIG. 7 with the second bracket pivoting relative to the base and the first bracket.

With further reference to FIGS. 7 and 8, the vertical-angular-positioning assembly (60) is mounted on the base (10) between the vertical-angular-positioning tab (12) and the first connector (51) of the second bracket (50). The vertical-angular-positioning assembly (60) positions the second bracket (50) and the cover at specific angular positions relative to the base (10) and the first bracket (20). The positioned first bracket (50) and cover may be pivoted by a deliberate external force. The vertical-angular-positioning assembly (60) has a sleeve (61), an inside vertical-angular-positioning ring (62), an outside vertical-angular-positioning ring (63), a spring (64) and an outer vertical-angular-positioning plug (65).

The sleeve (61) is hollow, is mounted on the vertical-angular-positioning tab (12) on the base (10) around the first horizontal shaft (53) and has an inside open end, an outside open end, multiple inside mounting protrusions (613) and multiple outside mounting notches (615).

The inside mounting protrusions (613) are formed on the inside open end and are mounted respectively in the mounting notches (123) in the vertical-angular-positioning tab (12) to securely mount the sleeve (61) on the base (10).

The outside mounting notches (615) are defined in the outside open end.

The inside vertical-angular-positioning ring (62) is mounted non-rotatably and slidably around the first horizontal shaft (53), is covered by the sleeve (61) and has a shaft hole and two positioning protrusions (621). The shaft hole is defined through the inside positioning ring (62), allows the first horizontal shaft (53) to extend through the shaft hole and has a non-circular cross section corresponding to that of the first horizontal shaft (53). The positioning protrusions (621) are formed on and protrude from the inside vertical-angular-positioning ring (62), are arranged around the shaft hole and selectively engage respectively with the inside positioning recesses (125).

The outside vertical-angular-positioning ring (63) is mounted non-rotatably and slidably around the first horizontal shaft (53), is covered by the sleeve (61) and has a shaft hole and two positioning protrusions (631). The shaft hole is defined through the outside vertical-angular-positioning ring (63), allows the first horizontal shaft (53) to extend through the shaft hole and has a non-circular cross section corresponding to that of the first horizontal shaft. The positioning protrusions (631) are formed on and protrude from the outside vertical-angular-positioning ring (63) and are arranged around the shaft hole in the outside vertical-angular-positioning ring (63).

The spring (64) is mounted around the first horizontal shaft (53) between the inside vertical-angular-positioning ring (62) and the outside vertical-angular-positioning ring (63), is covered by the sleeve (61) and presses against the inside vertical-angular-positioning ring (62) and the outside vertical-angular-positioning ring (63).

The outer vertical-angular-positioning plug (65) is mounted securely on the outside end of the sleeve (61) and has an outer edge, a shaft hole, multiple mounting tabs (655) and two positioning recesses (651). The shaft hole is defined through the outer vertical-angular-positioning plug (65) and allows the first horizontal shaft to extend through the shaft hole. The mounting tabs (655) are formed on and protrude from the outer edge of the outer vertical-angular-positioning plug (65) and are mounted respectively in the outside mounting notches (615) in the sleeve (61). The positioning recesses (651) are defined in the outer vertical-angular-positioning plug (65) and selectively engage respectively with the positioning protrusions (631) on the outside vertical-angular positioning ring (63).

The vertical-angular positioning assembly (60) has the sleeve (61) covering the inside and outside vertical-angular-positioning rings (62, 63) and the spring (64) to prevent dust from accumulating in the vertical-angular positioning assembly (60). Therefore, the hinge is durable.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
    a base having
        a top;
        a bottom;
        two opposite sides;
        a shaft hole defined vertically through the base;
        a vertical-angular-positioning tab formed on and protruding from one side of the base and having
            an outer edge;
            a shaft hole defined through the vertical-angular-positioning tab; and
            two inside positioning recesses defined in the vertical-angular-positioning tab; and
        a mounting tab formed on and protruding from the other side of the base and having a shaft hole defined through the mounting tab;

a first bracket mounted pivotally on the bottom of the base and having
   a shaft hole defined vertically through the first bracket and having a non-circular cross section;
a vertical shaft mounted vertically and rotatably through the shaft hole in the base, mounted non-rotatably through the shaft hole in the first bracket and having a top end and a non-circular cross section corresponding to that of shaft hole in the first bracket;
a second bracket mounted pivotally on the base and having
   a first connector mounted pivotally on the vertical-angular-positioning tab;
   a first horizontal shaft mounted rotatably through the shaft hole in the vertical-angular-positioning tab on the base, mounted securely on the first connector and having an inside end and a non-circular cross section;
   a second connector mounted pivotally on the mounting tab on the base; and
   a second horizontal shaft mounted rotatably through the shaft hole in the mounting tab on the base and having an inside end; and
a vertical-angular-positioning assembly mounted on the base between the vertical-angular-positioning tab and the first connector of the second bracket and having
   a sleeve being hollow, mounted on the vertical-angular-positioning tab on the base around the first horizontal shaft and having
      an inside open end;
      an outside open end; and
      multiple outside mounting notches defined in the outside open end;
   an inside vertical-angular-positioning ring mounted non-rotatably and slidably around the first horizontal shaft, covered by the sleeve and having
      a shaft hole defined through the inside positioning ring, through which the first horizontal shaft extends and having a non-circular cross section corresponding to that of the first horizontal shaft; and
      two positioning protrusions formed on and protruding from the inside vertical-angular-positioning ring, arranged around the shaft hole and selectively engaging respectively with the inside positioning recesses in the vertical-angular-positioning tab;
   an outside vertical-angular-positioning ring mounted non-rotatably and slidably around the first horizontal shaft, covered by the sleeve and having
      a shaft hole defined through the outside vertical-angular-positioning ring, through which the first horizontal shaft extends and having a non-circular cross section corresponding to that of the first horizontal shaft; and
      two positioning protrusions formed on and protruding from the outside vertical-angular-positioning ring and arranged around the shaft hole in the outside vertical-angular-positioning ring;
   a spring mounted around the first horizontal shaft between the inside vertical-angular-positioning ring and the outside vertical-angular-positioning ring, covered by the sleeve and pressing against the inside vertical-angular-positioning ring and the outside vertical-angular-positioning ring; and
   an outer vertical-angular-positioning plug mounted securely on the outside end of the sleeve and having
      a shaft hole defined through the outer vertical-angular-positioning plug and through which the first horizontal shaft extends;
      multiple mounting tabs formed on and protruding from the outer vertical-angular-positioning plug and mounted respectively in the outside mounting notches in the sleeve; and
      two positioning recesses defined in the outer vertical-angular-positioning plug and selectively engaging respectively with the positioning protrusions on the outside vertical-angular positioning ring;
the base further having two horizontal-angular-positioning recesses defined in the bottom of the base and arranged around the shaft hole in the base; and
a horizontal-angular-positioning assembly mounted on the base and the vertical shaft and having
   a horizontal-angular-positioning ring mounted non-rotatably and slidably around the vertical shaft adjacent to the bottom of the base and having
      a shaft hole defined through the horizontal-angular-positioning ring, through which the vertical shaft extends and having a non-circular cross section corresponding to that of the vertical shaft; and
      two positioning protrusions formed on and protruding from the positioning ring, arranged around the shaft hole in the positioning ring and selectively engaging respectively with the horizontal-angular-positioning recesses in the bottom of the base;
   a stationary limit mounted on the top of the base and having a limiting protrusion formed on and protruding from the stationary limit toward the vertical shaft; and
   a limiting ring mounted on the top end of the vertical shaft and having a limiting protrusion being semicircular, formed on and radially protruding from the limiting ring and having two ends selectively abutting the limiting protrusion on the stationary limit.

2. The hinge as claimed in claim 1, wherein:
the first horizontal shaft further has a flange formed on and protruding radially from the inside end of the first horizontal shaft and abutting the vertical-angular-positioning tab; and
the second horizontal shaft further has a flange formed on and protruding from the inside end of the second horizontal shaft and abutting the mounting tab.

3. The hinge as claimed in claim 2, wherein:
the vertical-angular-positioning tab on the base further has multiple mounting notches defined in the outer edge of the vertical-angular-positioning tab; and
the sleeve further has multiple inside mounting protrusions formed on the inside open end and mounted respectively in the mounting notches in the vertical-angular-positioning tab on the base.

* * * * *